US006577479B1

(12) United States Patent
Springer et al.

(10) Patent No.: US 6,577,479 B1
(45) Date of Patent: Jun. 10, 2003

(54) ARC SUPPRESSION CIRCUIT

(75) Inventors: Robert W. Springer, Los Alamos, NM (US); Donald E. Tolmie, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 312 days.

(21) Appl. No.: 09/649,862

(22) Filed: Aug. 28, 2000

(51) Int. Cl.[7] .................................................. H02H 3/00

(52) U.S. Cl. .......................... 361/55; 307/100; 307/141

(58) Field of Search .............................. 361/52, 54, 55, 361/57, 56, 111; 307/100, 116, 125, 126, 130, 131, 141, 157; 327/180–183, 301; 315/1, 3, 3.5, 5.36, 5.37, 91, 93, 107, 119, 123, 125, 127, 128, 156, 207, 333

(56) References Cited

U.S. PATENT DOCUMENTS

| | | | | |
|---|---|---|---|---|
| 3,627,966 A | | 12/1971 | Osenbruggen et al. | 219/69 C |
| 3,636,476 A | * | 1/1972 | Milberger | 327/181 |
| 3,665,250 A | | 5/1972 | Bales et al. | 317/16 |
| 3,700,928 A | | 10/1972 | Milberger et al. | 307/268 |
| 3,701,843 A | | 10/1972 | Hepner et al. | 178/5.4 SD |
| 3,808,559 A | * | 4/1974 | MacLachlan et al. | 332/106 |
| 3,828,157 A | | 8/1974 | Minick | 219/67 |
| 4,054,933 A | * | 10/1977 | Praeg | 361/57 |
| 4,153,857 A | | 5/1979 | Delsing et al. | 313/481 |
| 4,184,186 A | * | 1/1980 | Barkan | 361/10 |
| 4,187,467 A | | 2/1980 | Cummings | 325/133 |
| 4,324,950 A | | 4/1982 | Strickland | 179/1 A |
| 4,743,785 A | | 5/1988 | Milberger et al. | 307/571 |
| 5,162,965 A | | 11/1992 | Milberger et al. | 361/56 |
| 5,212,425 A | | 5/1993 | Goebel et al. | 315/111.21 |

* cited by examiner

*Primary Examiner*—Ronald W. Leja
(74) *Attorney, Agent, or Firm*—Milton D. Wyrick

(57) ABSTRACT

A circuit for suppressing electrical arcing in an ion beam source or other plasma devices is provided. The arc suppression circuit of this invention detects current rises on ion beam source grids which cause arcing, disconnects the current flowing to the grid, and grounds the ion beam source to allow excess charge and current to be drained from the ion beam source rather than letting the charge and current arc on the grids of the ion beam source. A novel timing sequence is used for activating and deactivating the arc suppression circuitry to prevent shorting out of the power source. The arc suppressor circuits of this invention can be used on devices other than ion beam sources or plasma devices.

9 Claims, 4 Drawing Sheets

ARC SUPPRESSION CIRCUIT

TECHNICAL FIELD

This invention relates to circuitry for electrical arc suppression.

This invention was made with government support under Contract No. W-7405-ENG-36 awarded by the U.S. Department of Energy. The government has certain rights in the invention.

BACKGROUND ART

When an ion beam source is operating, small points of conductive material can develop on parts of the ion gun beam source and particularly on the plasma grid of the ion beam source. When this happens, the potential for increased current from those points can occur when the plasma is present. Enough current can flow through those sharp points or microdefects to release gas that can cause other areas on the ion beam source and the grids that are marginally arc stable to become arc sources themselves. This positive feedback can cause massive electrical arcing to occur. The electrical arcing can cause material to be vaporized, resulting in evaporation of impurities as well as ejection and deposition of physical material onto the substrate, creating defects in film being coated.

Therefore, there is a need for a means for arc suppression in ion beam sources. There is a particular need for a means for arc suppression in flow through ion beam sources such as that disclosed in U.S. Pat. No. 5,601,654 issued Feb. 11, 1997.

It is an object of this invention to provide a means of electrical arc suppression.

It is another object of this invention to provide an apparatus particularly suited for suppression of electrical arcing in ion beam sources.

It is a further object of this invention to provide a means for electrical arc suppression in flow through ion beam sources.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims which are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a circuit for suppressing electrical arcing in an ion beam source or other plasma devices. The arc suppression circuit of this invention detects current rises on ion beam source grids which cause arcing, disconnects the current flowing to the grid, and grounds the ion beam source to allow excess charge and current to be drained from the ion beam source rather than letting the charge and current arc on the grids of the ion beam source. A novel timing sequence is used for activating and deactivating the arc suppression circuitry to prevent shorting out of the power source. The arc suppressor circuits of this invention can be used on devices other than ion beam sources or plasma devices.

BRIEF DESCRIPTION OF THE DRAWINGS

The accompanying drawings, which are incorporated in and form a part of the specification, illustrate a presently preferred embodiment of the present invention and, together with the description, serve to explain the principles of the invention. In the drawings.

BEST MODES FOR CARRYING OUT THE INVENTION

It has been discovered that an electrical circuit essentially operating as two switches with a timing device can be incorporated into the source voltage path of an ion beam source to suppress electrical arcing on the grid of the ion beam source. When an overload fault is detected by a load sensor or current shunt in the source voltage path current which activates and sustains the plasma on the grid, one switch (drive switch) opens the source voltage path to stop current flow to the grid. Then, after a delay from about one to about a hundred or more microseconds, a second switch (dump switch) closes to allow the excess charge and current to be drained from the ion beam source path to a ground rather than traveling through the plasma grid. Once the overload fault in the plasma is cleared, the dump switch is opened to disconnect the connection to ground. Then, after a delay from about one to about a hundred or more microseconds, the drive switch is once again closed to resume a flow of current in the source voltage path.

Arcing on the grid of an ion beam source causes an increase in the amount of plasma activity on the ion beam source plasma grid, which in turn lowers electrical resistance, thereby causing increase in arcing occurrence and pressure in the normal vacuum of the ion beam source. The of arcing can be stopped by stopping the flow of current to the grid where the arcing is occurring and grounding the current overload which is in the source voltage path. Turning off the current going to the source voltage path off before grounding the current from the source voltage path through the plasma grid area of the ion beam source prevents shorting out of the power source. And, once the overload fault that causes the arcing is corrected, disconnecting the current flow to the ground before restoring power to the ion beam source voltage path prevents shorting out of the power source. A delay of 100 or more milliseconds is sufficient time for a vacuum to recover in the chamber of the ion beam source.

For applications other than arc suppression in ion beam sources, the delay times can easily be adjusted by changing the resistor and capacitor network that is used on the timer circuits of the invention arc suppression device.

Figures 1A, 1B, 1C, 1D, 1E, 1F:
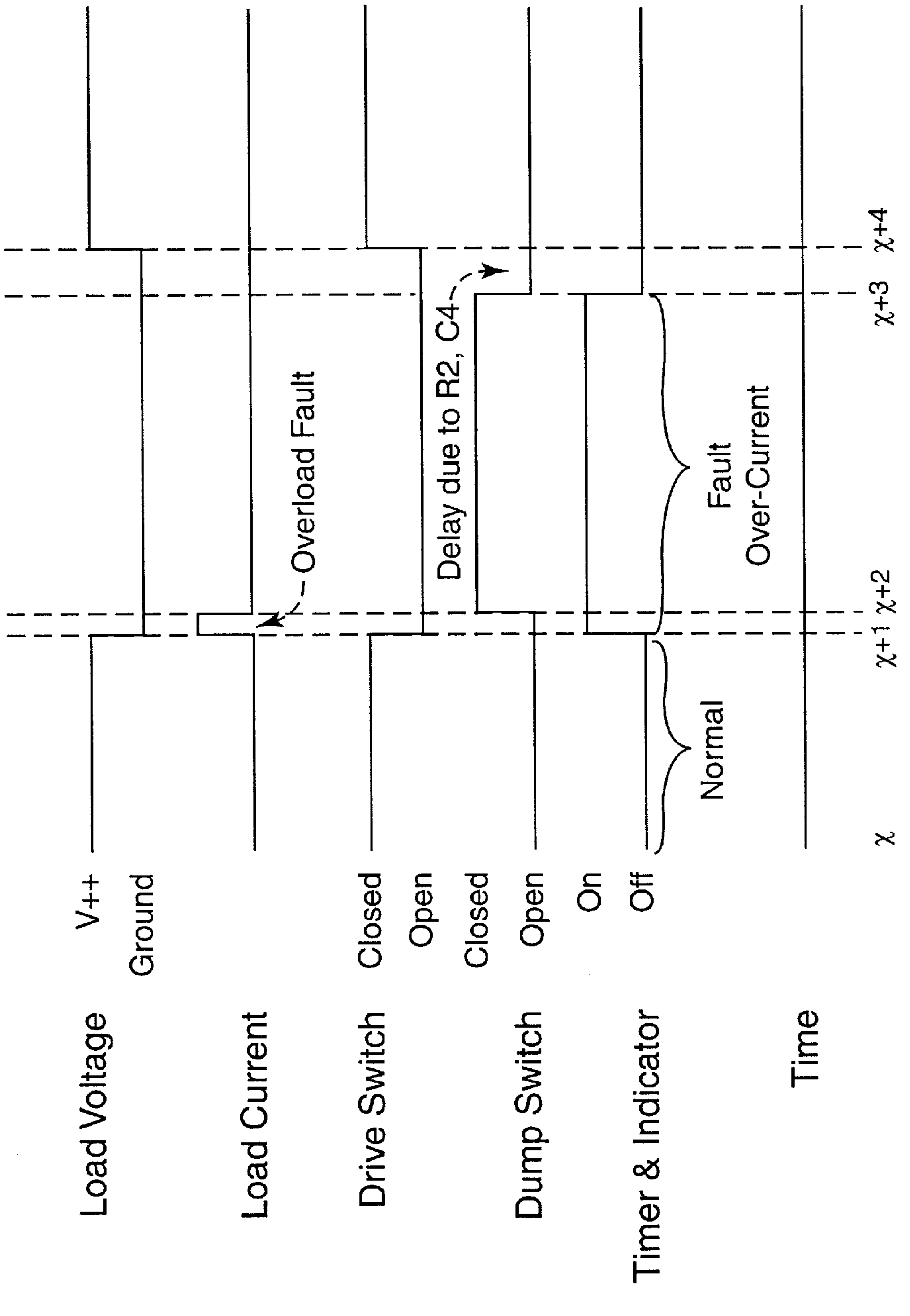
FIGS. 1A, 1B, 1C, 1D and 1E are waveforms in a timing diagram for operation of the invention arc suppression circuit switches, with FIG. 1F being the elapsed time line.

FIGS. 1A, 1B, 1C, 1D and 1E are waveforms in a timing diagram for operation of the invention arc suppression circuit switches, with FIG. 1F being the elapsed time line. The timing diagram of FIGS. 1A, 1B, 1C, 1D, 1E and 1F further illustrate the invention timing sequences. From the waveforms of these figures it can be seen that when the drive switch (FIG. 1C) is in the closed position, the load voltage (FIG. 1A) is in closed position, and the load current flowing through the source voltage path through the ion beam source plasma grid (FIG. 1B) is at normal operating levels. The dump switch to ground (FIG. 1D) is in the open position so that no current from the source voltage path is being drained off to ground. The timer and indicator (FIG. 1E) is in the off position showing normal operating current activity in the source voltage path. Once an overload fault occurs in the load current (FIG. 1B) at time x+1, the timer and indicator opens the drive switch (FIG. 1C) to stop flow of additional current into the ion beam source plasma grid area and about a few microseconds thereafter, the timer closes the dump switch (FIG. 1D) to allow the overcharge to drain to ground. There is no direct cause and effect relationship between when the fault clears and when the dump switch operates because the dump switch is actuated by the timer rather than a load sensor that senses the fault.

Still with reference to the timing diagram of FIGS. 1A, 1B, 1C, 1D and 1E, once the overload fault (elevated portion of FIG. 1B) is cured at time x+2 by draining the overcharge to ground, as shown on the timer and indicator (FIG. 1E), the timer reopens the dump switch (FIG. 1D) to disconnect the connection to ground. After a delay of about a few microseconds, the timer closes the drive switch (FIG. 1C), thereby restoring power to the ion beam source plasma grid as shown in the load voltage (FIG. 1A).

Figure 2:
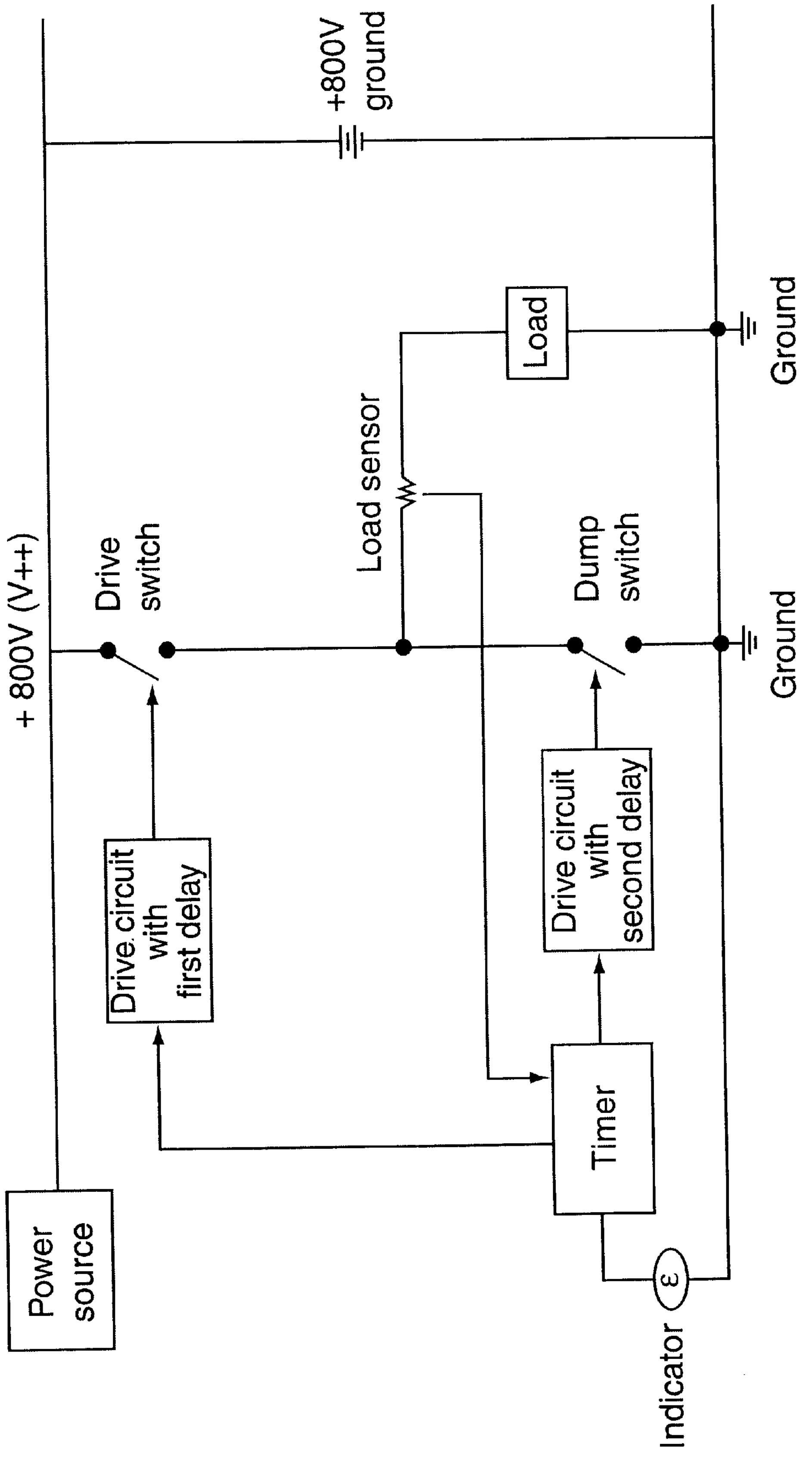
FIG. 2 is an example of an invention arc suppression circuit.

FIG. 2 is a simplified block diagram of an arc suppression circuit set up in accordance with the invention. In the example of the invention circuitry shown in FIG. 2, a power source supplies 800 volts through a drive switch (shown in the open position in FIG. 2) to the load (e.g., an ion beam source plasma grid). A load sensor is incorporated in the electrical connection between the drive switch and the load.

The load sensor is connected to a timer device which, when activated by a current overload fault signal from the load sensor in the voltage path, activates an optical isolator which triggers the timer. The circuit with the timer device opens the drive switch (shown in the open position in FIG. 2). The timer device, when activated by the signal from the load sensor in the voltage path that there is an overload fault, also activates a circuit with a second time delay device to close a dump switch (shown in the open position in FIG. 2). Closing the dump switch completes an electrical circuit that connects the load sensor to the load which is connected to ground so that the overload of current is drained from the circuit to ground. When the dump switch is closed and the current is being drained to ground, the electrical load is no longer connected to the power source because of the open drive switch, so no additional current is being conducted into it. The circuit is timed so that the circuit functions as a break before make switch, thereby insuring that the power source is never shorted to ground.

When the overload has been drained to ground, and the load sensor is sending a normal current level signal to the timer, the timer activates the dump circuit with a time delay controlled by the second delay device, which in turn opens the dump switch (position shown in FIG. 2). The timer also activates the drive circuit with the first delay so that, after a few microseconds, the drive switch is closed, once again allowing current into the voltage path to operate the load. This portion of the circuit also functions as a break before make switch, thereby insuring that the power source is protected from being shorted to ground.

An indicator ε of any suitable sort, such as a red LED driven by the timer, shows when an overload is sensed so that an operator will know which switches are opening and closing and thus which circuits are complete at any given time. This is useful when conditioning the electrical load, particularly in the case of an ion beam source grid as the load after it has been exposed to air or after it has been rebuilt. When the electrical load is the grid of an ion beam source, the frequency of the flashes tells the operator when the ion beam source is malfunctioning, or if a steady plasma has been developed, and whether conditions are good for plasma work to occur.

Figure 3:
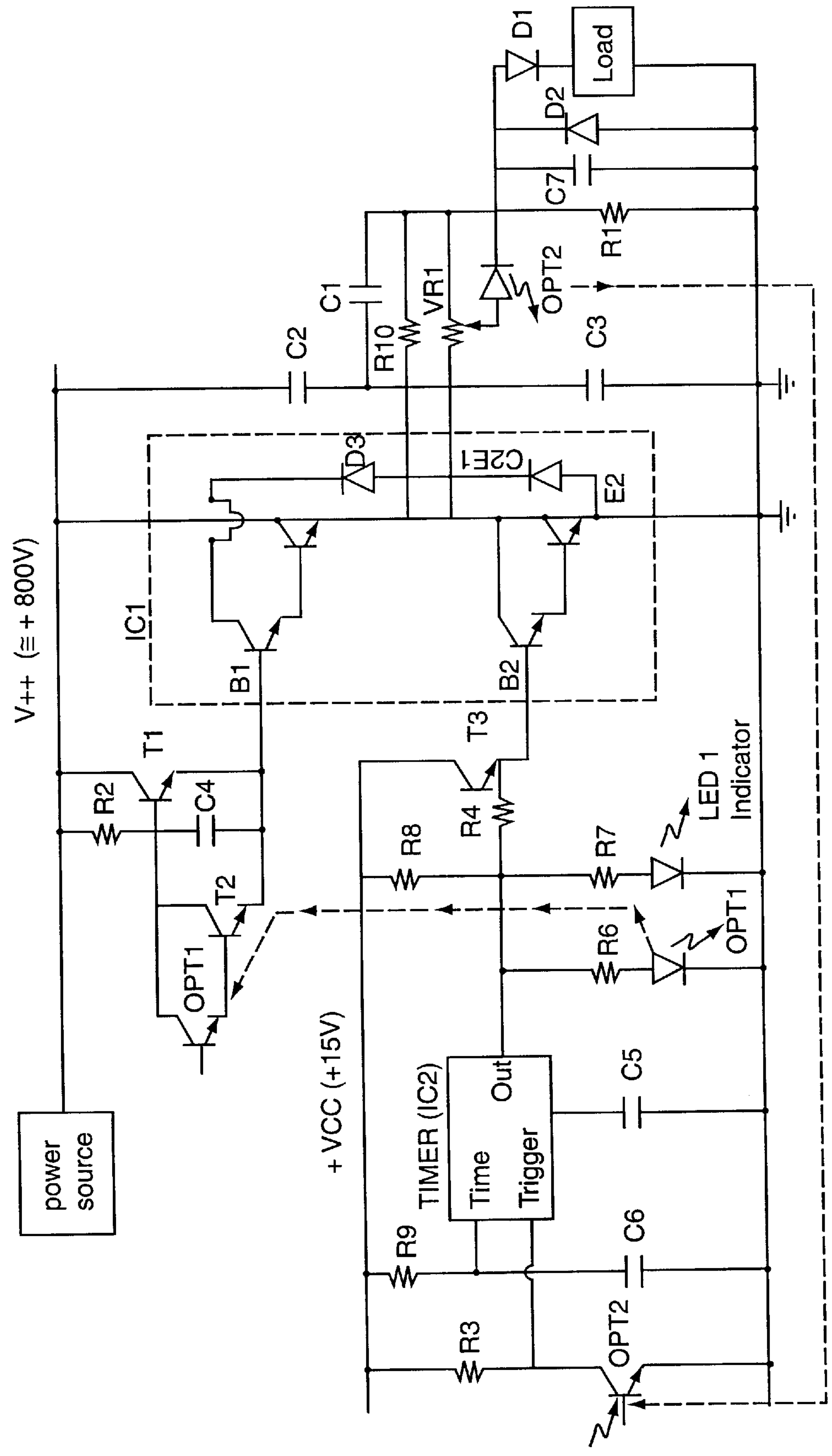
FIG. 3 is a schematic of the invention circuit for arc suppression in a flow through ion beam source.

FIG. 3 is a more detailed schematic of an example of an arc suppression circuit which operates in accordance with the present invention.

With reference to FIG. 3, a first integrated circuit IC1 functions as a dual switch to supply current to a drive switch and to a dump switch. Power from any suitable power source is introduced to the junction of a first capacitor C1 on the first integrated circuit IC1 and to a second capacitor C2. The first capacitor C1 is an output sensor filter capacitor. The second capacitor C2 is an output filter which is connected to a third capacitor C3, also an output filter. The third capacitor C3 is grounded. The pair of capacitors C2 and C3 are placed simply to eliminate any possible parasitic oscillation in the circuit and to allow any short transient currents to be filtered out.

A connection from the junction of the first capacitor C1 and the first integrated circuit IC1 is made to a first resistor R1 and VR1 which supplies the load with the current. A second resistor R2 is connected to a first bias transistor T1 which holds the circuit of IC1 on. The first bias transistor T1 supplies drive current to turn the drive switch on when it is active.

The connection of the input from the junction of the first integrated circuit IC1 with a capacitor C4 to a resistor R4 and the first transistor T1 forms a bias network to turn on the Darlington circuitry of the upper half of the first integrated circuit IC1 through a first base B1. The current into the first base B1 causes the voltage from the first integrated circuit IC1 to rise to the voltage near V++ provided by the power source at the junction of the first integrated circuit IC1 and the first capacitor C1. A bias resistor R2 which is a drive current source for the first transistor T1 is connected to IC1 B1 which allows some current to flow into IC1 B1 and allows the device to be "biased" to an on status. A first free wheeling diode D1 is a diode in the drive output to the load and provides protection for the driver against reverse currents or load positive ringing. A second diode D2 is another freewheeling diode to dampen any load negative ringing and allows any energy stored in the stray inductive components to have a path to ground.

Still with reference to FIG. 3, during normal operation, the lower half of the first integrated circuit IC1 is turned off. A resistor R3 serves as a pull up resistor to the timer input bias. When an arc begins to draw current that rises above a few amperes, enough voltage is developed across a current sensing resistor R10, the first capacitor C1 and a first variable resistor VR1 to turn on the photodiode in OPT2 which causes the output of OPT2 to conduct and start the timer. The first variable resistor VR1 is used to adjust the sensitivity of the circuit as desired during operation of the ion beam source or other device in which arcing is to be suppressed.

Dotted lines on the circuit diagram between the optical isolators with the same designation indicate the relationship between the internal components of the integrated circuits.

When the timer begins after receiving the signal from OPT2, the first optical isolator OPT1 is energized and the first half of the first integrated circuit IC1 is opened as the bias current through T1 is cut off by shorting C4. Again, the dotted lines on the circuit diagram indicates the link between the two components that are in the same integrated circuit package. The current through R2 is not enough to turn on the first half of the IC1 circuit. At this point, the output of the timer is high, causing the indicator light to be lit. Turning on T3 turns on the bottom half of IC1 which brings the common point C2E1 to ground from nearly V++.

The timer, IC2, determines the duration of the shut down of the circuit. After this circuit action occurs for the selected length of time, the third transistor T3 is turned off, and the reference point IC1-C2E1 becomes "ungrounded", allowing the current to rise again as the upper half of the first integrated circuit IC1 turns back on.

A fourth capacitor C4 is a drive switch delay capacitor which ensures that the power is not restored to the IC1 until the short, or ground of C2E1 has been removed.

The time constant formed by resistor R2 and the capacitor C4, about 20 milliseconds in this example, causes the upper part of the first integrated circuit IC1 to be turned on a little after the turn off of the lower half of the first integrated circuit IC1. This temporal delay keeps both halves of the first integrated circuit IC1 from being on at the same time. Without this small time constant, the timing of the circuit is so fast that it is possible for all the components of the first integrated circuit IC1 to be turned on simultaneously, allowing a short circuit to occur between the main power supply, V++, and ground, thereby damaging the first integrated circuit IC1. The small time constant formed by the junction of the first resistor R1 and the fourth capacitor C4 prevents this undesirable effect from occurring, allowing long component life and effective circuit action.

The pair of passive components of this invention provides the drive circuit delay portion of the block diagram shown in FIG. 2. It can be replaced with a fixed timer so that it can be energized for a selected length of time, e.g., 20 milliseconds, after the timer IC2 has timed out.

After the foregoing cycle, the ion beam source or other device then runs until another current surge is detected. When the next current surge is detected, the entire process is repeated.

Figure 4:
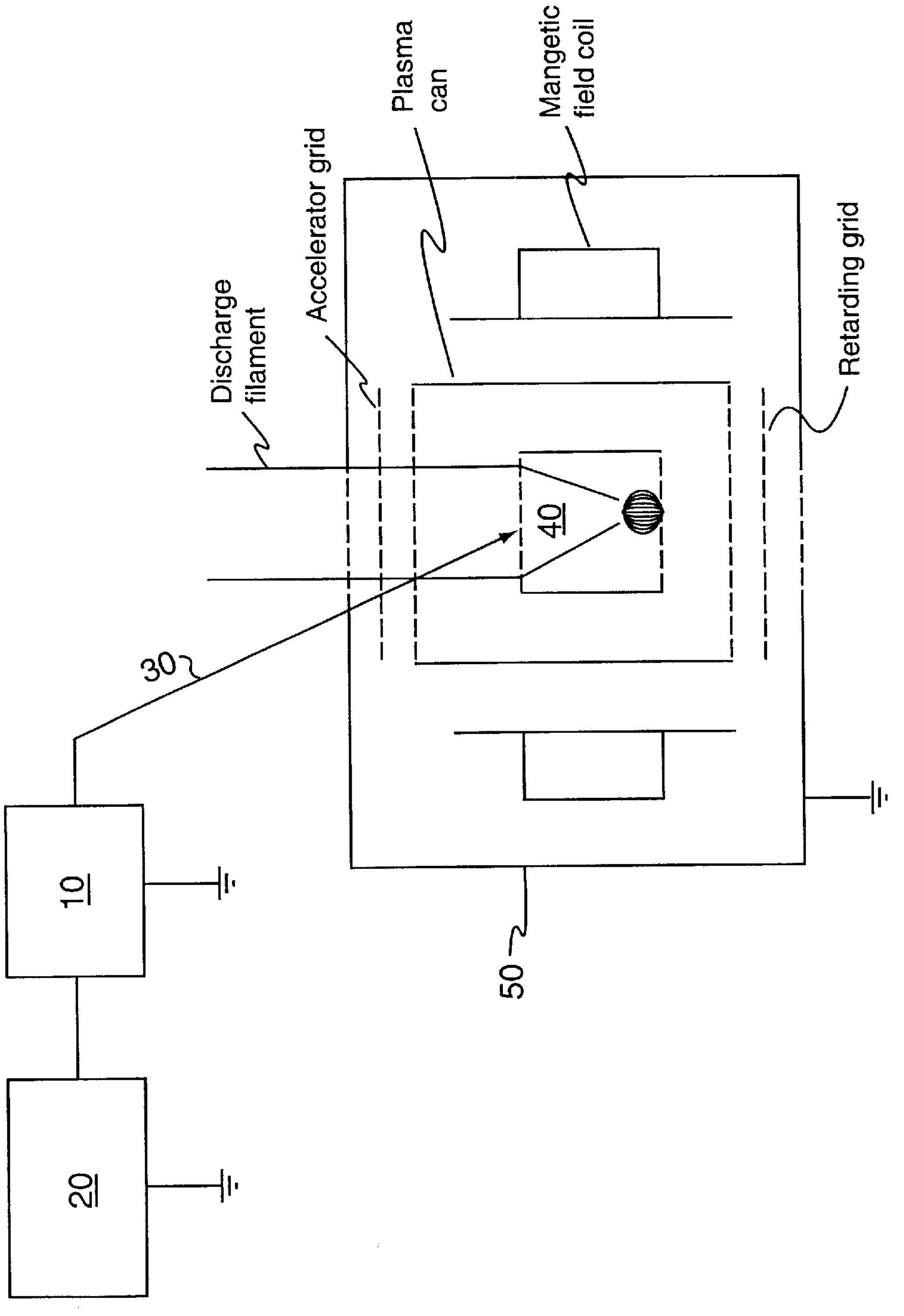
FIG. 4 is a schematic diagram of how the arc suppression circuit of this invention can be incorporated into the circuitry for a flow through ion beam source.

The arc suppression circuits of this invention can be placed in series with any positive voltage supply. Therefore, the arc suppression circuits of this invention can be used for suppression of arcing in most ion beam sources, and are particularly useful in flow through ion beam sources such as that disclosed in U.S. Pat. No. 5,601,654. FIG. 4 shows a schematic diagram of how the arc suppression circuit of this invention can be incorporated into the circuitry of a flow through ion beam source.

With reference to FIG. 4, the arc suppression circuit 10 is connected to a main power supply source 20 which is capable of operating in a range from just greater than 0 to about 800 V. Both the arc suppression circuit 10 and the main power supply source 20 are grounded. An electrical connection 30 is made from the arc suppression circuit 10 to the plasma discharge chamber 40 of the flow through ion beam source 50.

While the apparatuses, articles of manufacture and methods of this invention have been described in detail for the purpose of illustration, the inventive apparatuses, articles of manufacture and methods are not to be construed as limited thereby. This patent is intended to cover all changes and modifications within the spirit and scope thereof.

INDUSTRIAL APPLICABILITY

The arc suppression circuits of this invention can be used to prevent arcing in any number of electrical devices, including ion beam sources, and are particularly useful for arc suppression in flow through ion beam sources.

What is claimed is:

1. An electrical arc suppression circuit comprising:

(a) a load sensor for detecting a current overload connected to an electrical load;

(b) said load sensor is also connected by a first electrically conducting pathway to a first switch for opening a first pathway conducting current from a power source to said electrical load, and by a second electrically conductive pathway to a second switch for opening a second pathway conducting current from said electrical load to ground;

(c) said load sensor is also connected to a timer which is connected by a third electrically conductive pathway to said first electrically conductive pathway to said first switch for opening said first pathway conducting current to said electrical load and which is also connected by a fourth electrically conducting pathway to said second electrically conductive pathway from said electrical load to said ground;

(d) a first electrical time delay is in said third electrically conducting pathway from said timer to said first switch; and (e) a second electrical time delay is in said fourth electrically conducting pathway from said timer to said second switch.

2. The arc suppression circuit of claim 1 wherein said arc suppression circuit further comprises an indicator connected to said timer and to said ground so as to indicate when current is being drained to ground.

3. The arc suppression circuit of claim 1 wherein said electrical load is a grid in an ion beam source.

4. The arc suppression circuit of claim 1 wherein said timer is activated by an optical isolator in said second pathway conducting current from said electrical load to said ground.

5. A method of suppressing arcing on an electrically charged grid comprising:

(a) monitoring the current load on the grid, thereby detecting when an overload fault occurs;

(b) opening a drive switch, thereby shutting off current going to the grid; then (c) after a delay, closing a ground switch to ground current from the grid;

(d) monitoring the current load on the grid, thereby detecting when current load on the grid is back to normal operating level;

(e) opening the ground switch so that current from the grid is no longer draining to ground; then (f) after a delay, closing the drive switch to restore current flow to the grid.

6. The method recited in claim 5 wherein the current load on the grid is continuously monitored.

7. The method recited in claim 5 wherein said delay in step (c) and said delay in step (f) are each in the range from about one to about a hundred microseconds.

8. The method recited in claim 5 wherein steps (a) through (f) are repeated at any time an overload fault occurs.

9. The method recited in claim 5 wherein said electrically charged grid is a grid in an ion beam source.

* * * * *